March 29, 1966 E. W. J. CADDY ETAL 3,243,188

RECORD CHANGING MECHANISM

Filed Dec. 18, 1961 3 Sheets-Sheet 1

March 29, 1966 E. W. J. CADDY ETAL 3,243,188

RECORD CHANGING MECHANISM

Filed Dec. 18, 1961 3 Sheets-Sheet 2

March 29, 1966 E. W. J. CADDY ETAL 3,243,188

RECORD CHANGING MECHANISM

Filed Dec. 18, 1961 3 Sheets-Sheet 3

United States Patent Office 3,243,188

Patented Mar. 29, 1966

3,243,188

RECORD CHANGING MECHANISM

Edward William John Caddy, Swindon, England, and Lawrence Vincent Guest, deceased, late of Shrewsbury, England, by Iris Dulcie Guest and Francis Gregory Guest, administrators, both of Shrewsbury, England, assignors to The Garrard Engineering and Manufacturing Company Limited, Swindon, Wiltshire, England Filed Dec. 18, 1961, Ser. No. 160,361
Claims priority, application Great Britain, Dec. 20, 1960, 43,701/60
7 Claims. (Cl. 274—10)

This invention relates to a record changing mechanism for incorporation into an automatic record changing phonograph, and it is an object of the present invention to provide an improved mechanism of relatively simple construction for playing a number of records of different sizes mixed in any order.

The present invention consists in a record changing mechanism which includes a selector arranged to be positioned in one of a number of angular positions in accordance with the size of a record dropped from a stack above the turntable, and in one of a number of linear positions in accordance with the angular position adopted, each linear position corresponding to a setting for the pick up arm for playing a record of a particular size.

In one form of the invention, the selector consists of a selector cam secured to a selector shaft carrying at its upper end a selector arm so that as a record is dropped from a stack above the turntable the record engages the selector arm and thereby rotates the selector shaft and the cam on it to an angular position corresponding to the size of the dropped record. The shaft is then rocked or canted in its bearings so that the cam is moved bodily to a linear position corresponding to its angular position. In this linear position, the lower end of the shaft is disposed so as to lie in the path of one of the steps of a pick-up lever movable with the pick-up arm and thereby position the lever and the pick-up arm correctly for lowering onto the record previously dropped from the stack.

For a fuller understanding of the invention, reference is had to the following description taken in connection with the accompanying drawings, in which.

Figure 1:
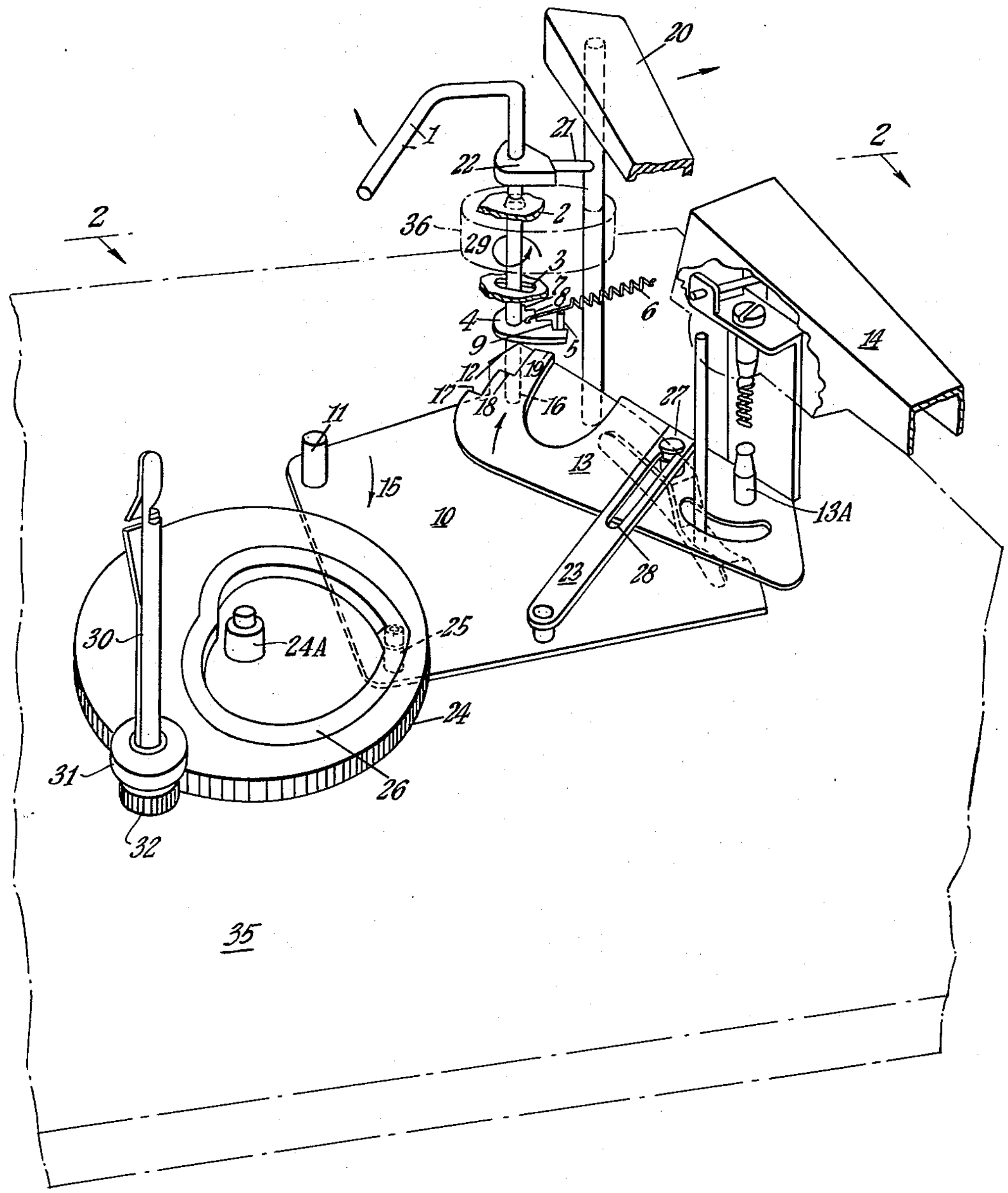
FIG. 1 is a perspective view of a record-changing mechanism constructed in accordance with the invention, with certain portions being removed or broken away to show the operating elements of the mechanism.
Figure 2:
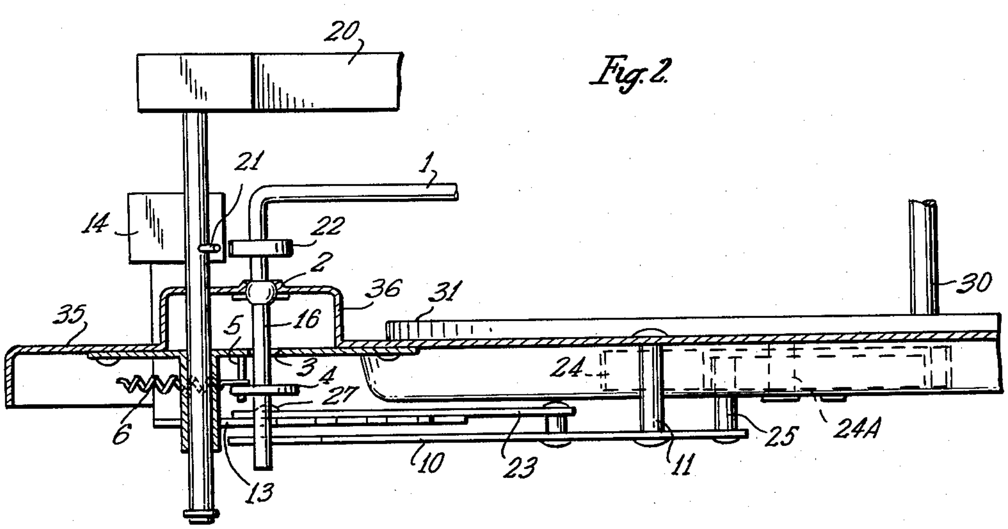
FIG. 2 is a partial, sectional elevational view looking in the direction of arrows 2—2 in FIG. 1.

In carrying the invention into effect according to one convenient mode by way of example, as shown in the accompanying drawings, a record changer including a base plate 35 carries a record changing device which is provided with a selector arm 1 having a shaft 16 which is pivoted through an upright portion 36 of the base plate in a tapered top bearing 2 at its upper end and at its lower end in a slotted bearing 3. With this arrangement due to the universal action of top bearing 2, the arm 1 can be rotated outwardly, and the shaft 16 correspondingly angularly displaced, by a 10″ or 12″ record falling from a stack supported on a spindle 30 above the turntable 31 onto the turntable and engaging the arm 1 on its way, and the shaft 16 can also rock in the slotted bearing 3.

A cam 4 having three faces or steps 7, 8 and 9, is fixed to the lower end of the selector shaft 16, the cam being caused to contact the fixed pin 5 at one cam face by the action of spring 6. Pin 5 and spring 6 are secured to base plate 35. When the selector arm 1 is rotated and moved outwardly on being struck by a dropping record and the lower end of shaft 16 is freed to move, the spring 6 pulls the cam 4 onto contact with the pin 5, cam 4 is rotated and the appropriate face 7, 8 or 9 engaging the pin 5.

The selector arm 1 is rotated outwardly by a 10″ or 12″ record, but not if a 7″ record is dropped, the shaft 16 being then rocked in its slot 3 as hereinafter described to engage the 7″ face 9.

In order to understand fully the action of the selector shaft 16 in the slotted bearing 3, the movement of the plate 10 must be defined. Plate 10 is oscillated by a cam 24, pivoted to the base plate as at 24A, by cooperation of a roller 25 on plate 10 with a cam track 26. Cam 24 is selectively rotated by a gear 32 on turntable 31 during a record change cycle. Initiation of a record change cycle commencing rotation of cam 24 may be accomplished by any suitable means, such as that shown in U.S. Patent No. 2,640,705, issued to E. W. Mortimer on June 2, 1953. This plate 10 pivots around pivot centre 11 so that face 12 engages shaft 16 and moves it to the extremity of the slot 3 away from the fixed pin 5. In that position, shown in FIG. 3, which is the position at the end of the cam cycle, the lever 13, pivoted to the base plate as at 13A, fixed to the pickup arm 14 to rotate with it, is free to pass the vertical shaft 16 of the selector arm 1 without touching it. This enables the pickup arm 14 to track across a record freely during playing.

Figure 4:
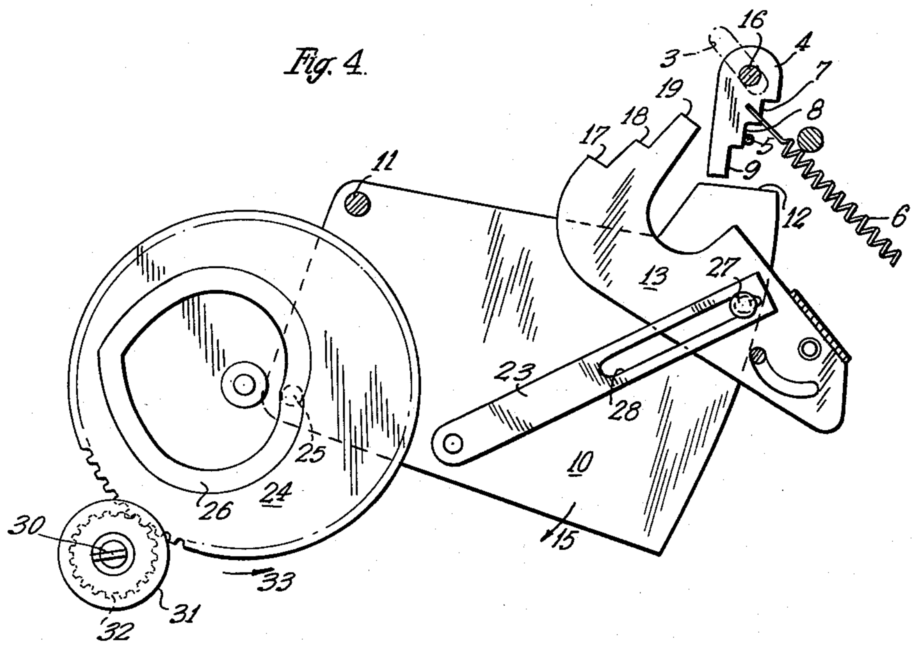
FIG. 4 is a view similar to FIG. 3 with the elements being shown in an operating position.

Referring to FIG. 4, as a change cycle is initiated, cam 24 is rotated in the direction of arrow 33, and as the plate 10 rotates in the direction of the arrow 15, face 12 moves towards and past the fixed pin 5 and the slotted bearing 3 allows the cam 4 to move bodily under the action of spring 6 to bring face 9 in contact with pin 5. This, then, brings the end of the shaft 16 in the path of face 17. This face 17 corresponds to the 7″ position of the pickup arm 14.

When a 10″ record falls from the stack it will engage the selector arm 1 and rotate this arm outwardly to such an extent that cam face 8 is brought in line with pin 5. The 10″ position is the position shown, for purposes of example, in FIG. 4. The spring will therefore pull the lower end of the shaft 16 through the slotted bearing 3 until face 8 and pin 5 engage and then the end of the shaft 16 will be in the path of face 18, which is the 10″ dropping position. FIG. 4 represents the position of the elements when cam 24 has rotated only partially through the change cycle and plate 10 has moved the maximum amount in the direction of arrow 11.

However, if a 12″ record is dropped, the record will move selector arm 1 outwardly until face 7 is in line with pin 5 and the spring 6 will then pull the shaft 16 over through the slotted bearing 3 until face 7 and pin 5 engage one another. Thus the end of the shaft 16 will lie in the path of face 19 which corresponds to the 12″ dropping position.

Figure 5:
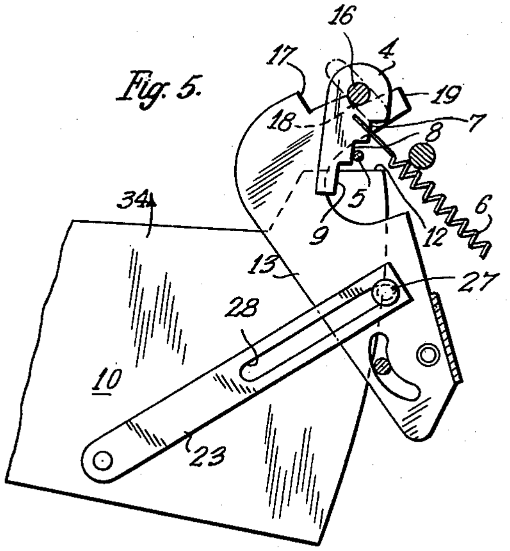
FIG. 5 is a partial view similar to FIG. 4 with the elements being shown at a later time in the cycle of operation of the changing mechanism.

As cam 24 continues its rotation, plate 10, by cooperation of roller 25 with cam track 26 will be moved in the reverse direction as shown by arrow 34 in FIG. 5 and, by cooperation between friction arm 23 and lever 13, to be hereafter described, lever 13 is moved toward shaft 16 to thereby move the pickup arm into the correct position at the periphery of the record. As stated heretofore, the FIG. 5 position corresponds to the pickup arm being in position at the periphery of a 10″ record.

After the correct dropping position for the pickup arm has been selected by the mechanism through the dropping of the record from the stack and movement of plate 10 and lever 13, the pickup arm is positioned on the record, and by continued movement of plate 10 in the direction of arrow 34 the face 12 of plate 10 is moved into contact with shaft 16 to move it to the far end of the slotted bearing 3, the shaft 16 being held in this position so that it is completely clear of the path of lever 13. This is the re-set position and normal playing position shown in FIG. 3.

The cam 24 oscillates the plate 10 by means of a roller 25 engaging in cam track 26 as heretofore described. The movement of plate 10 is transmitted to the lever 13 via a friction arm 23, but this arm 23 is arranged to prevent the motion of plate 10 from being transmitted to lever 13 when any one of the selector faces 17, 18 and 19 is in contact with shaft 16. To this end, a slot 28 is provided in the arm 23 and arranged to exert a spring grip on pin 27 by means of a constricted portion at one end of the slot.

In this way, when the constricted portion of the slot 28 grips the pin 27, the lever 13 can be rotated in either direction during the cam cycle by a corresponding linear movement of the arm 23, but when one of the faces 17, 18 and 19 is brought into contact with shaft 16 arresting further movement of lever 13, a continued movement of plate 10 and arm 23 causes the pin 27 to be disengaged from the constricted portion and to pass freely along the length of the slot. For a 7" record the pin 27 is gripped by the slot 28 until face 17 contacts shaft 16.

The slot 28 is arranged to be clear of pin 27 past the constricted portion and thus the arm 28 is clear of frictional engagement with lever 13 when the pin 27 passes along the length of the slot. The point at which the pin 27 is released from frictional engagement with arm 23, and thus the angular setting of lever 13, depends upon which one of the faces 17, 18 and 19 is brought into contact with shaft 16.

A pin 21 is provided on the shaft which carries a steadying arm 20 so that when the arm 20 is swung outwardly, the pin 21 engages cam 22 on the shaft 16 and rotates the selector arm 1 outwardly thereby facilitating removal of records from the turntable after playing.

Figure 3:
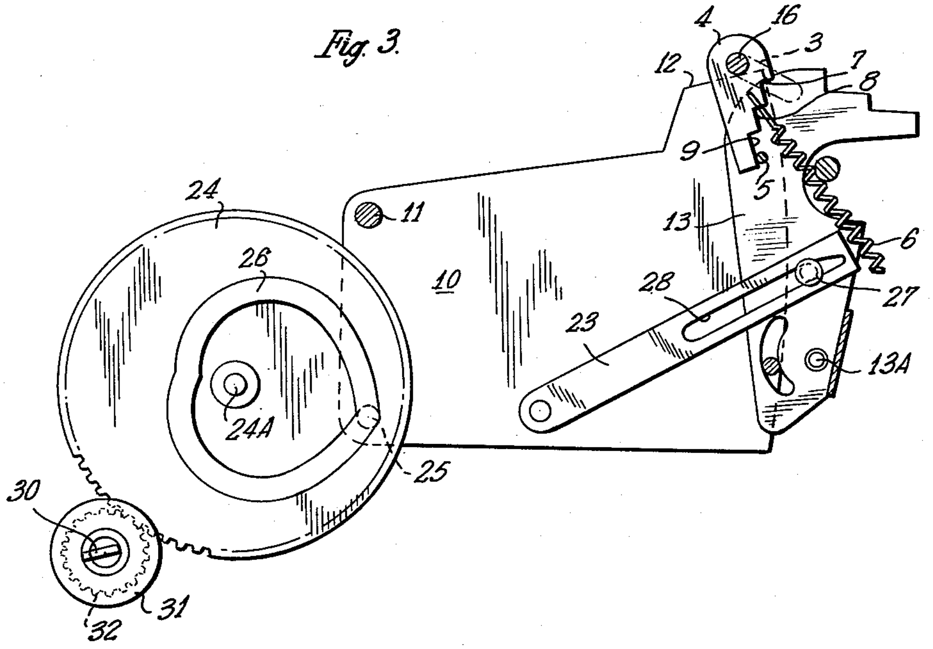
FIG. 3 is a partial plan view of certain operating elements of the record changing mechanism shown in a normal, non-operating position.

It will be noted that spring 6 also applies a twisting movement to seletcor shaft 16 in the direction of arrow 29 so that the selector arm 1 is rotated back to its normal (innermost) position FIG. 3 at the end of the record-changing cycle of the cam 24 when face 12 on lever 10 has moved the shaft 16 clear of the steps 7, 8 and 9, any one of which may have been in engagement with the pin 5.

Various modifications may be made within the scope of the present invention.

What is claimed is:

1. In a record changer of the type described the combination comprising a base plate, record change cycling means mounted on said base plate, a pickup arm, a setting lever pivoted to said frame, said pickup arm being secured to said setting lever, an operating element pivoted to said base plate, follower means connected between said operating element and said record change cycling means for effecting arcuate oscillation of said operating element during a change cycle, means connected between said operating element and said setting lever for selectively pivoting said setting lever in response to oscillation of said operating element, a selector shaft, means mounting said selector shaft on said base plate for rotation and lateral movement with respect to said base plate, a selector arm extending from said selector shaft, a cam plate secured to said selector shaft, means defining at least two cam surfaces on said cam plate, a pin fixed to said base plate proximate to said cam surfaces, means connected to said base plate and said cam plate for biasing said cam surfaces toward said pin, and means defining at least two cam surfaces on said setting lever proximate to said selector shaft, said cam surface means adapted to limit the movement of said pickup arm and setting lever during a record change cycle in response to selector arm controlled engagement of one of said cam surfaces on said cam plate with said pin.

2. A record changer as claimed in claim 1 and further including abutment means on said operating element engageable with said selector shaft for maintaining said selector shaft in a non-contacting relationship with respect to said cam surfaces on said setting plate except during a record change cycle.

3. In a record changer, mechanism as claimed in claim 1, in which said means for mounting said selector shaft comprises a universal joint type bearing for said selector shaft on said base plate, and means defining a linear slot fixed with respect to said base plate through which said selector shaft extends, for guiding said selector shaft during linear displacement thereof.

4. A record changer as claimed in claim 1, wherein said means connected between said operating element and said setting lever comprises a friction arm pivoted at one end to said operating element and means slideably and frictionally mounting the other end of said friction arm to said setting lever.

5. A record changer as claimed in claim 4 wherein said friction arm comprises an elongated link and said means slideably and frictionally mounting said friction arm to said setting lever comprises means defining a relatively elongated slot in said elongated link and a pin secured to said setting lever and passing through said slot, an end of said slot being constricted for frictional engagement with said pin, the remaning length of said slot providing for free movement of said pin therealong.

6. A record changer as claimed in claim 1, wherein each of said cam surfaces have stepped faces corresponding to preselected starting positions of said pickup arm, the number of stepped faces on said cam plate equalling the number of stepped faces on said setting plate.

7. A record changer as claimed in claim 1 and further including a steadying arm having a record playing position and a record mounting position, a steadying arm shaft slidably and pivotally mounting said steadying arm to said base plate, and camming means cooperating between said steadying arm shaft and said selector shaft for rotating said selector shaft when said steadying arm is in said record mounting position whereby said cam surfaces on said cam plate are held out of engagement with said pin.

References Cited by the Examiner

UNITED STATES PATENTS

| | | | |
|---|---|---|---|
| 2,488,260 | 11/1949 | Ascoli | 274—15 |
| 2,752,159 | 6/1956 | Bacher | 274—10 |
| 2,825,570 | 3/1958 | Guest | 274—10 |
| 2,868,547 | 1/1959 | Vistain | 274—10 X |
| 2,939,464 | 6/1960 | Guest | 274—15 X |

LOUIS J. CAPOZI, *Primary Examiner.*

ALDRICH F. MEDBERG, *Examiner.*

A. S. ALPERT, *Assistant Examiner.*